(12) United States Patent
Carley

(10) Patent No.: US 6,574,484 B1
(45) Date of Patent: Jun. 3, 2003

(54) METHOD FOR EMERGENCY SERVICE ACCESS USING A MOBILE PHONE

(75) Inventor: Jeffrey A. Carley, Colo. Spgs., CO (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/453,107

(22) Filed: Dec. 2, 1999

(51) Int. Cl.$^7$ ................................................. H04Q 7/20
(52) U.S. Cl. ........................ 455/521; 455/404; 455/456
(58) Field of Search ................................ 455/404, 521, 455/410, 411, 414, 456; 379/51, 37, 41, 45

(56) References Cited

U.S. PATENT DOCUMENTS

| | | | |
|---|---|---|---|
| 5,388,147 A | | 2/1995 | Grimes |
| 5,444,764 A | * | 8/1995 | Galecki |
| 5,479,482 A | * | 12/1995 | Grimes ........................ 455/556 |
| 5,631,947 A | * | 5/1997 | Wittstein et al. ........ 379/114.17 |
| 5,678,188 A | * | 10/1997 | Hisamura ................... 455/524 |
| 5,742,666 A | * | 4/1998 | Alpert ......................... 455/404 |
| 5,867,821 A | * | 2/1999 | Ballantyne et al. ............ 705/2 |
| 5,937,355 A | | 8/1999 | Joong et al. |
| 5,959,580 A | | 9/1999 | Maloney et al. |
| 6,038,440 A | * | 3/2000 | Wu .............................. 455/410 |
| 6,070,065 A | * | 5/2000 | Armbruster et al. ........ 455/456 |
| 6,073,004 A | * | 6/2000 | Balachandran .............. 455/404 |
| 6,073,013 A | * | 6/2000 | Agre et al. .................. 455/404 |
| 6,073,106 A | * | 6/2000 | Rozen et al. .................. 705/3 |
| 6,082,776 A | * | 7/2000 | Feinberg ...................... 283/72 |
| 6,140,936 A | * | 10/2000 | Armstrong ................. 340/5.74 |
| 6,198,914 B1 | * | 3/2001 | Saegusa ....................... 455/404 |
| 6,230,017 B1 | * | 5/2001 | Andersson et al. ......... 455/456 |
| 6,345,180 B1 | * | 2/2002 | Reichelt ....................... 455/404 |
| 2002/0025800 A1 | * | 2/2002 | Forbes et al. ............... 455/414 |
| 2002/0065063 A1 | * | 5/2002 | Uhlik et al. ................. 455/404 |

* cited by examiner

Primary Examiner—Tracy Legree

(57) ABSTRACT

There is provided a method for emergency service access using a mobil telephone. When an emergency situation arises and a caller enters an emergency number such as 911 [send] from a locked mobile telephone, the mobile telephone compares the entered value (911) with a list of emergency numbers stored in the memory of the mobile telephone. If the entered number is on the known emergency number list, the mobile telephone immediately places the emergency call even though the telephone is locked. All other key combinations will be compared to a user defined access code previously stored in memory. If the entered value matches the value stored in memory, the mobile phone will be unlocked and ready for normal use. If the values do not match, the mobile phone will remain disabled. In addition, during an emergency call, a mobile provider provides a set of emergency contact records (ECR) to an emergency public service answering point (PSAP). These emergency contact records may include information for each member in the family, including the individual's name, home address, phone number, physical description, emergency contact name and number, doctor's name and number, emergency medical information, such as drug allergies, temporary conditions, such as a pregnancy, a digital image, and any other information the subscriber deems relevant for the PSAP to know in an emergency. In the event the subscriber places a call while not in the subscriber's home system, the local MSC will send a request to the subscriber's home system asking the home system to send the subscriber's ECRs to the PSAP. In an additional embodiment of the invention, the MSCs will send a request to an independent organization which maintains ECRs and request the organization to send the information to the PSAP selected by the MSC.

15 Claims, 5 Drawing Sheets

| | NAME 210 | ADDRESS 220 | PHONE # 230 | PHYS. DESCR. 240 | EMERG'Y CONTACT # 250 | DOCTOR'S NAME 260 | DOCTOR'S PHONE # 270 | ALLERGIES 280 | SPECIAL CONDITIONS 290 |
|---|---|---|---|---|---|---|---|---|---|
| ECR1 | | | | | | | | | |
| ECR2 | | | | | | | | | |
| ... | | | | | | | | | |
| ECRn | | | | | | | | | |

METHOD FOR EMERGENCY SERVICE ACCESS USING A MOBILE PHONE

BACKGROUND OF THE INVENTION

1. Field of the Invention

The present invention relates generally to mobile communications and, in particular, to a method for emergency service access using a mobile telephone.

2. Description of the Related Art

Providers of emergency services, such as fire, police and rescue departments have been greatly aided in their efforts to provide service to individuals in need by the introduction of the 911 emergency number which is now prevalent in the United States. Similarly, the widespread use of mobile telephones has decreased the emergency response time as more and more passing motorists are able to dial 911 shortly after an emergency situation arises. Occasionally, however, the caller's efforts to dial 911 are hampered because the mobile phone may be configured so as to require the entry of an access code to unlock the phone prior to making a telephone call. While the access code prevents the unauthorized use of the mobile telephone, its requirement delays or prevents the dialing of an emergency 911 call when it is the victim's phone which is used to make the call.

Clearly, there is a need in the art for a method of bypassing, in an emergency situation, the entry of an access code to unlock a phone prior to making a telephone call.

U.S. Pat. No. 5,479,482 to Grimes discloses a cellular terminal for providing public emergency call location information. The cellular terminal transmits information defining its location upon placing a 911 call using a global satellite positioning (GPS) device. In addition, the cellular terminal can be programmed to transmit personal characteristics the subscriber has programmed into the cellular terminal. In an emergency situation, the terminal transmits this information as digital information at the same time as the location information is transmitted to the public safety answering point (PSAP) system utilized by the emergency service provider. Unfortunately, the information that could be programmed into the cellular terminal would be limited and would be for a single individual. In an emergency situation information could be needed for an entire family. Therefore, there is a need in the art for a method of transmitting more extensive personal medical records and records for more than one individual to a PSAP system.

SUMMARY OF THE INVENTION

It is therefore an object of the present invention to provide a method for bypassing, in an emergency situation, the need for entering an access code to unlock the phone prior to sending a call from a mobile telephone that has been locked.

It is another object of the present invention to provide a method for sending emergency information from a mobile switching center (MSC) to a PSAP system in the form of an emergency contact record (ECR).

It is an additional object of the present invention to provide a method for transmitting a request to send emergency contact records to the PSAP in the event the mobile subscriber is not placing the call through their home system.

To achieve these objects, there is provided a method for emergency service access using a mobile telephone. The mobile telephone stores a list of emergency numbers to be used by mobile service providers. This list could include 911 and *911 for requesting a call to be placed to the nearest PSAP, *FIRE for the nearest fire department, *ER for the nearest emergency room, *HP for the nearest highway patrol office, and *POL for the nearest police station. The mobile service provider would estimate the mobile telephones location by what base station the mobile telephone is communicating with and would route the call to the nearest emergency service provider requested. When an emergency situation arises and the mobile telephone is locked and the caller enters a number followed by [send], the mobile telephone compares the entered value (*911) with a list of known emergency numbers stored in the memory of the mobile telephone. If the number entered is one of the known emergency numbers, the terminal will immediately place the emergency call even though the mobile phone is locked. All other key combinations will be compared to a user defined access code previously stored in memory. The previously entered access code is required to unlock the mobile telephone. This number prevents the unauthorized use of the mobile phone and deters theft. If the entered value matches the user access code stored in memory, the mobile phone will be unlocked and ready for normal use. If the values do not match, the mobile phone will remain locked.

In a preferred embodiment, when the 911 emergency sequence is keyed and transmitted to the MSC, the MSC will determine the proper PSAP to connect the subscriber to based on the base station through which they are connected. The MSC will also direct that base station and neighboring base stations to begin procedures for locating the subscriber's mobile telephone. Methods for locating a mobile caller are known in the art and disclosed in U.S. Pat. No. 5,388,147 to Grimes and U.S. Pat. No. 5,959,580 to Maloney et al.

The mobile service provider will provide for a set of emergency contact records (ECR) that may be maintained by the subscriber for themselves and their family. The subscriber may maintain these emergency contact records using a variety of methods including, but not limited to, talking with an administrator from the mobile provider, accessing a secure web page, or mailing in updates to the mobile provider. These emergency contact records may include information for each member in the family, including the individual's name, home address, phone number, physical description, emergency contact name and number, doctor's name and number, emergency medical information (such as drug allergies), temporary conditions (such as a pregnancy), a digital image, and any other information the subscriber deems relevant for the PSAP to know in an emergency.

At the time the emergency call is placed, if the MSC is part of the subscriber's home system, the MSC will have access to the subscriber's ECRs and will send them to the PSAP for use during the emergency. It should be noted that there are many possible methods for sending the ECRs to the PSAP. In a preferred embodiment, the ECRs are sent to the PSAP over the Internet. Other possible methods may include the sending of a facsimile transmission, the sending of an e-mail, or even directing an operator from the mobile service provider to call the PSAP and provide the information over the telephone. One skilled in the art will recognize that there are many possible and effective ways to communicate the ECRs to the PSAP system.

In the event the subscriber places a call while not in the subscriber's home system, the local MSC will send a request to the subscriber's home system asking the home system to send the subscriber's ECRs to the PSAP and will provide an ordered list of methods for transmitting the ECRs to the PSAP.

In an additional embodiment of the present invention, the ECRs are maintained by an independent organization and when a 911 emergency call is placed the MSCs will send a request to the independent organization which maintains ECRs and request the organization to send the information to the PSAP selected by the MSC.

BRIEF DESCRIPTION OF THE DRAWINGS

These and other objects and features of the present invention will become apparent from the following detailed description considered in connection with the accompanying drawings in which:

FIG. 2 is a diagram illustrating the data structure of an emergency contact record (ECR);

DETAILED DESCRIPTION OF PREFERRED EMBODIMENTS

Figure 1:
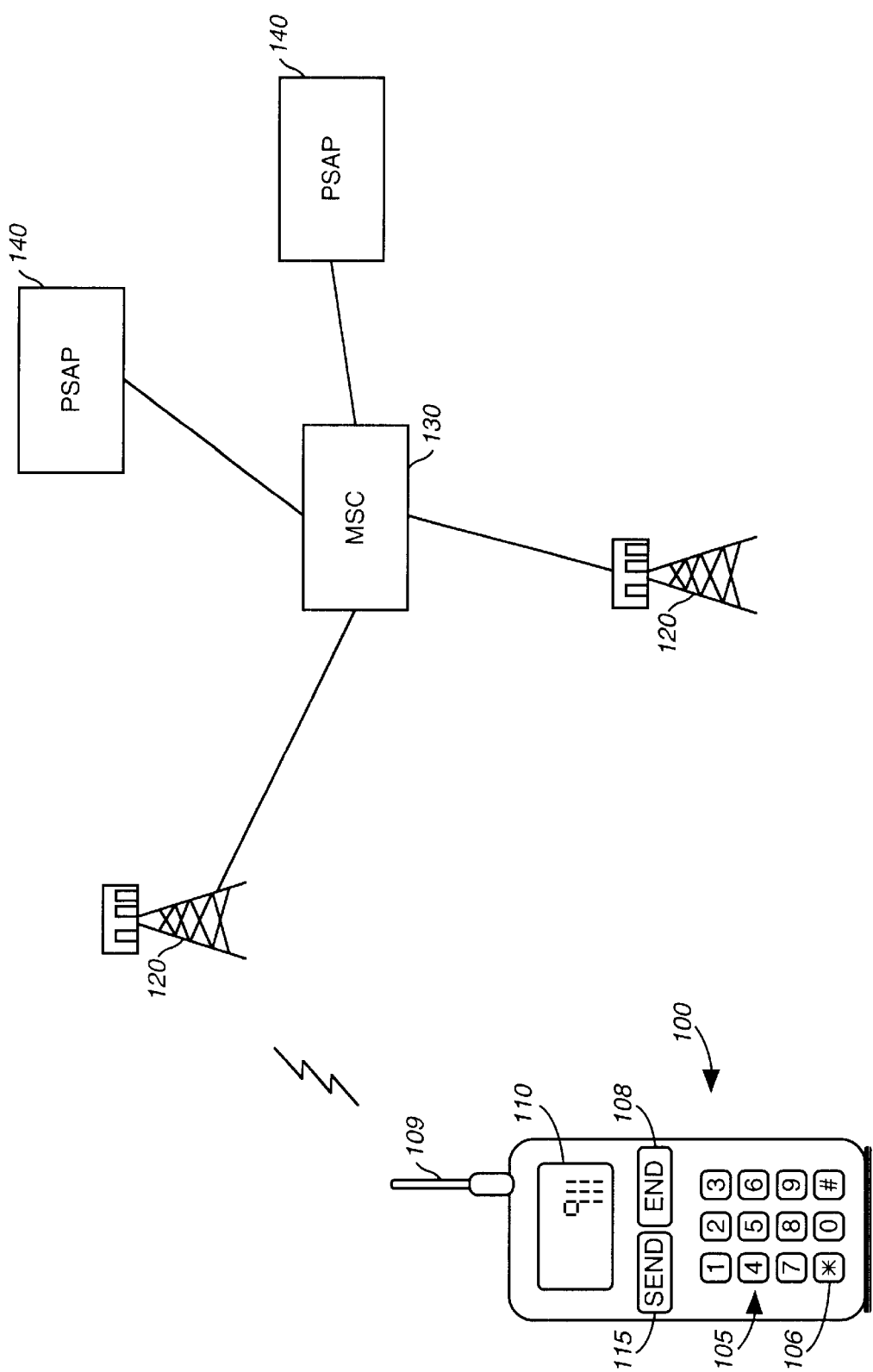
FIG. 1 is a schematic view of a reference model for a method for emergency service access using a mobile phone according to the present invention.

Referring now to the drawings, in which similar reference characters denote similar or identical elements throughout the several views, FIG. 1 shows a reference model for a method of providing emergency access service using a mobile telephone. A mobile telephone 100 comprises an antenna 109 for transmitting and receiving data, a display 110 for displaying information and a plurality of keys 105. The plurality of keys 105 contains the numerals zero through nine, a star (*) key 106 and a pound (#) key 107. In addition, a send key 115 and an end key 108 are similarly disposed on mobile telephone 100. A user may make an emergency 911 call by using the plurality of keys 105 and pushing the send button 115. A call is then transmitted via antenna 109 to at least one base station 120. A mobile switching center (MSC) 130 is connected to the at least one base station 120 and processes the call.

When the emergency sequence is keyed and transmitted to MSC 130, MSC 130 determines a proper public safety answering point PSAP 140 based on the base station 120 receiving the caller's signal and connects the subscriber thereto.

When the 911 emergency call is placed through the subscriber's home system using mobile telephone 100, the home MSC 130 provides emergency contact records (ECR) 200 (FIG. 2) to the PSAP 140.

Referring to FIG. 2, there is shown a block diagram of the data structure of an emergency contact record 200. Emergency contact record 200 comprises several fields including but not limited to a name field 210, an address field of the subscriber 220, a telephone number of the subscriber field 230, and a physical description 240 corresponding to the name field 210. In addition, emergency information such as an emergency contact number 250, a physician's name 260, a physician's telephone number 270, and a known allergies field 280. ECR 200 may also include a special condition field 290 which may include any information the subscriber deems important for PSAP 140 to be made aware of in an emergency situation. Some examples of special conditions are the presence of high blood pressure, the presence of current medications being taken, or the existence of a pregnancy. ECR 200 may also include a digital photo which could be used for identification purposes or medical diagnosis (recent X-rays).

The emergency contact records 200 may also be grouped together based on family relationships and comprise multiple ECRs, for example, ECR1, ECR2, to ECRn. In the event of an emergency situation, the entire ECR family record may be transmitted to the PSAP 140.

Figure 3:
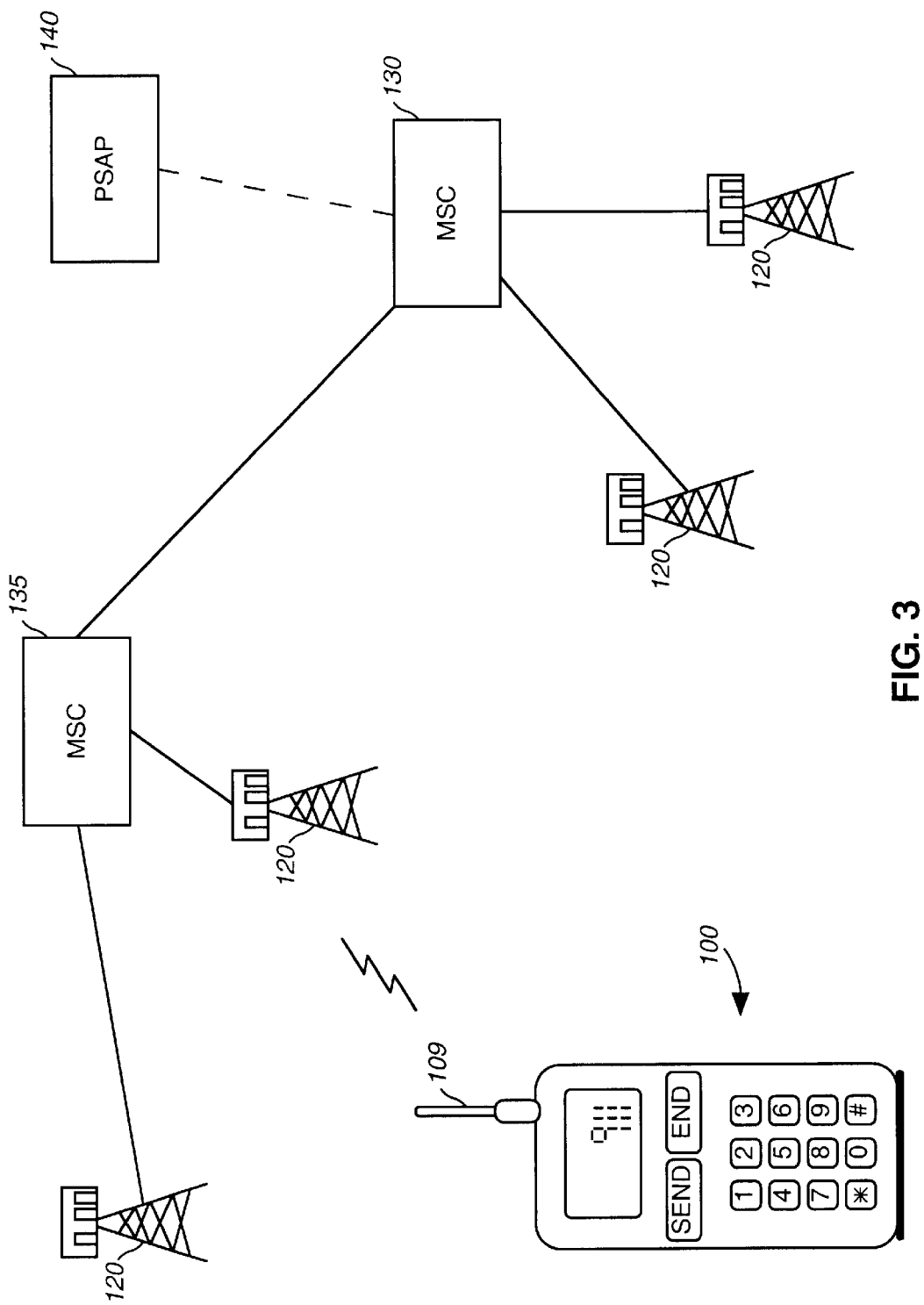
FIG. 3 is a schematic view of a model for a method for providing emergency service access using a mobile phone according to an additional embodiment of the present invention.

Referring now to FIG. 3, there is shown a schematic diagram of an additional embodiment of the present invention. One advantage of having a mobile telephone is that a subscriber may place a phone call in a wide geographic area and is limited only by the availability of the service in the area and the type of calling plan purchased. At times, a user may place a phone call outside of their home system serviced by their home MSC 130. The call would be picked up by base station 120 and transmitted to a local MSC 135. Local MSC 135 will not have access to the ECRs 200 of the subscriber, and therefore, MSC 135 will send a request to the subscriber's home MSC 130 asking the home MSC 130 to send the subscriber's ECRs 200 to the PSAP 140. In this manner, the PSAP 140 will have available vital information concerning the mobile subscriber placing the call. The availability of the ECRs 200 to PSAP 140 may help in the treatment and identification of a subscriber. The information included in ECR 200 is generally recorded in a non-emergency situation and would therefore be more complete and accurate than similar information obtained during an emergency situation. It should be noted that generally there is already a connection between MSCs to provide for call roaming and that requesting ECRs would be a new set of requests to be transmitted between MSCs.

Figure 4:
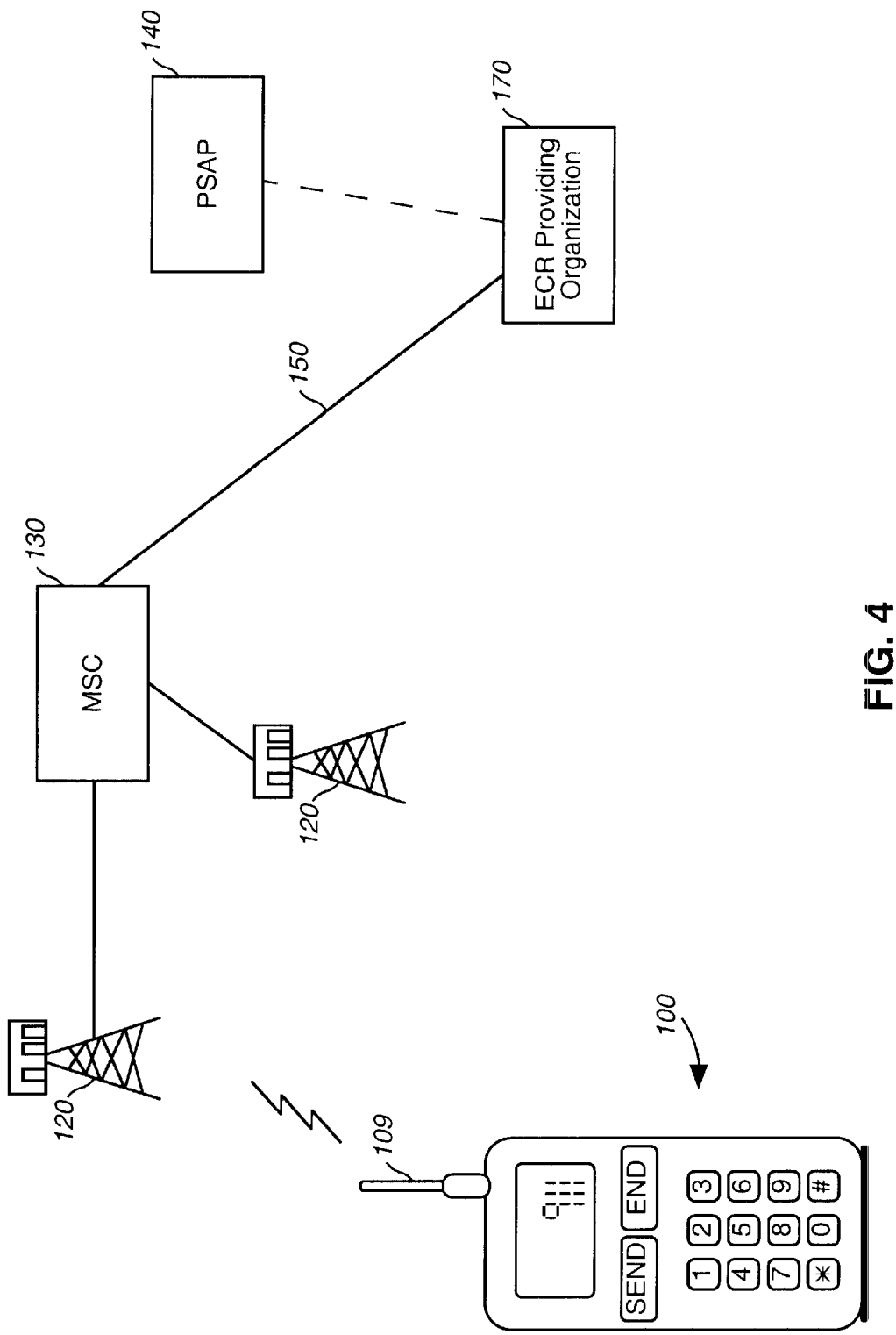
FIG. 4 is a schematic view of a model for a method for providing emergency service access using a mobile telephone according to an additional embodiment of the present invention.

Referring now to FIG. 4, there is shown a schematic diagram of an additional embodiment of the present invention. In this exemplary embodiment, a third-party emergency contact record providing organization 170 is contacted by MSC 130 via communication line 150 and requested to provide ECR 200 to PSAP 140. According to this exemplary embodiment, all 911 emergency calls will immediately generate a request to the ECR providing organization 170 to provide ECRs 200 directly to PSAP 140. This embodiment eliminates the need for MSC 130 to contact the subscriber's home MSC.

Figure 5:
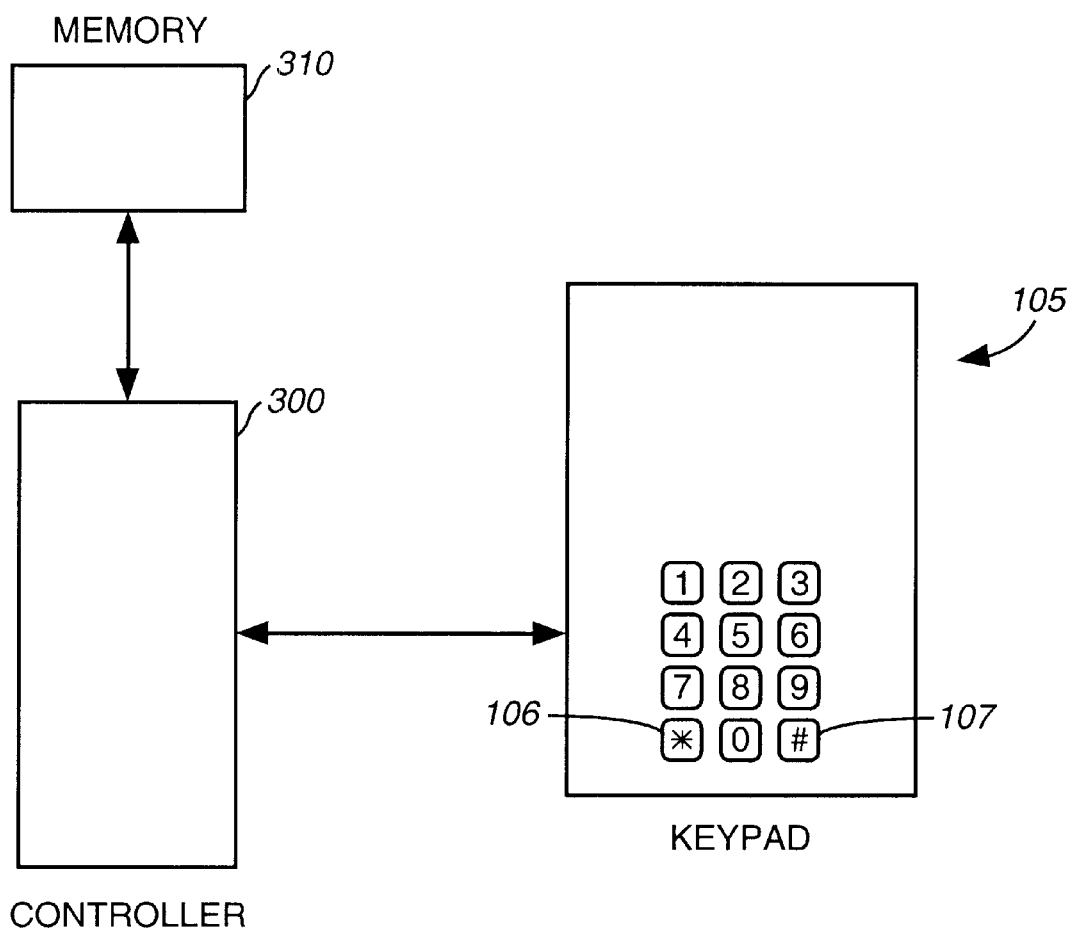
FIG. 5 is a schematic diagram of a mobile telephone and a method of bypassing, in an emergency situation, the need for entering an access code to unlock the mobile phone prior to sending an emergency call.

Referring to FIG. 5, there is shown a schematic diagram of the necessary components of a mobile telephone for implementing a method of bypassing, in an emergency situation, the need to input a user access code, when the mobile telephone is locked, prior to sending a call. The mobile telephone comprises a controller 300, a memory 310 and a keypad 105. Memory 310 may be any suitable type of permanent memory, such as a ROM or EEPROM. In addition, keypad 105 contains a * key 106 and a # key 107. When a mobile telephone is locked and the subscriber places an emergency call, the keypad input is compared to a list of known emergency numbers stored in the memory 310 of mobile telephone 100. If controller 300 determines that the input from keypad 105 is equal to an emergency number stored in memory 310, controller 300 directs the mobile telephone to send the emergency call even though the mobile telephone is locked. On the other hand, if the information input from keypad 105 is not an emergency call, but matches a user access code stored in memory 310, the controller 300 enables the mobile telephone for normal use. If the information entered by keypad 105 does not match an emergency number or the user access number stored in memory 310, the controller 300 leaves the mobile telephone locked. In this manner, if a mobile subscriber is unconscious and their mobile telephone is locked, any passerby may use the subscriber's mobile terminal to make an emergency call only. All other numbers entered, unless they match the user's access code, will leave the mobile telephone in a disabled state. Upon the setup of the emergency call, the subscriber's ECRs 200 are transmitted from MSC 130 to the proper PSAP 140.

While the present invention has been described in terms of a mobile communication system having a basic structure as disclosed in a code division multiple access (CDMA) system, it is understood that the present invention may be modified to work with other communication systems.

While several embodiments of the present invention have been shown and described, it is to be understood that many changes and modifications may be made thereunto without departing from the spirit and scope of the invention as defined in the appended claims.

What is claimed is:

1. A method for providing emergency service access using a mobile telephone, comprising the steps of:
   receiving an emergency call from a mobile telephone subscriber in a local mobile switching center (MSC);
   determining an identity of said mobile telephone subscriber;
   determining whether said local MSC is the mobile telephone subscriber's home mobile switching center; and
   sending one or more emergency contact records (ECRs) corresponding to said identity of said mobile subscriber from said home MSC to a public safety answering point (PSAP), if the mobile telephone subscriber is calling from said home MSC.

2. The method as claimed in claim 1, wherein the step of sending said ECRs to said PSAP further includes the steps of:
   determining a proper PSAP by said local MSC receiving said emergency call; and
   determining a proper method to send said (ECRs) to said PSAP,
   wherein said proper PSAP is the closest PSAP to the mobile telephone's location, and
   said proper method to send said ECRs is the quickest and most reliable route.

3. The method as claimed in claim 1, further comprising the step of sending a request to said home MSC to send said corresponding (ECRs) to said PSAP, if the mobile telephone subscriber is not calling from said home MSC.

4. A method according to claim 1, wherein the mobile telephone subscriber in the receiving step utilizes a mobile telephone to place the emergency call, the method further comprising:
   inputting a number into the mobile telephone via a keypad located on said mobile telephone;
   comparing said number with a list of a plurality of emergency numbers stored in memory using a controller located within said mobile telephone, said emergency numbers corresponding to respective types of emergency service providers;
   generating a call to a local mobile switching center if said input number matches one of the emergency numbers; and
   during said call, communicating with an emergency service provider of the corresponding type determined by the local mobile switching center based on the input number and a geographical position of said mobile telephone.

5. The method according to claim 4, further comprising the steps of:
   comparing said number to a subscriber access code stored in said memory;
   enabling said mobile telephone, if said input number matches said user access code; and
   leaving said mobile telephone disabled, if said input number does not match said use access code.

6. The method according to claim 4, wherein 911 is a number on said known emergency numbers list.

7. The method according to claim 4, wherein *911 is a number on said known emergency numbers list.

8. The method according to claim 4, wherein *HP is a number on said known emergency numbers list.

9. The method according to claim 4, wherein *FIRE is a number on said known emergency numbers list.

10. The method according to claim 4, wherein *ER is a number on said known emergency numbers list.

11. The method according to claim 4, wherein *POL is a number on said known emergency numbers list.

12. The method as claimed in claim 1, wherein one of the emergency contact data records comprises:
   a name field;
   a phone number field;
   an emergency contact number field;
   a treating physician's name field;
   a treating physician's phone number field; and
   a digital photo identification field.

13. The emergency contact data record structure according to claim 12, further comprising:
   a known allergy field; and
   a special conditions field,
   wherein said special conditions field may include one of a high blood pressure field, a diabetes field, and a pregnancy field.

14. A method according to claim 1, wherein the mobile telephone subscriber in the receiving step utilizes a locked mobile telephone to place the emergency call, the method firther comprising:
   inputting a number into said locked mobile telephone;
   comparing said number with a list of a plurality of emergency numbers stored in said locked mobile telephone, said emergency numbers corresponding to respective types of emergency service providers;
   generating a call to a local mobile switching center, if said input number matches one of said one or more numbers on said known emergency numbers list,
   wherein the call is routed to an emergency service provider of the corresponding type by the local mobile switching center based on the input number and a geographical position of said mobile telephone.

15. A method for providing emergency service access using a mobile telephone, comprising the steps of:
   receiving an emergency call from a mobile telephone subscriber in a local mobile switching center (MSC);
   determining an identity of said mobile telephone subscriber;
   sending a request to an emergency contact record (ECR) providing organization to send one or more emergency contact records (ECRs) corresponding to said identity of said mobile subscriber to a public safety answering point (PSAP), wherein the step of sending said request to said ECR providing organization further includes the steps of:
  determining a proper PSAP by said local MSC receiving said emergency call;
  determining a proper method to send said ECRs to said PSAP, wherein said proper PSAP is the closest PSAP to the mobile terminal subscriber's location and said proper method to send said ECRs is the quickest and most reliable route; and
  transmitting said determinations to said ECR providing organization along with said request.

* * * * *